June 9, 1959 J. J. ROMAN 2,889,647
FILM JACKET
Filed Sept. 15, 1954

INVENTOR.
JACK J. ROMAN
BY
HIS ATTORNEY

United States Patent Office 2,889,647
Patented June 9, 1959

2,889,647
FILM JACKET
Jack J. Roman, Clifton Heights, Pa.
Application September 15, 1954, Serial No. 456,181
1 Claim. (Cl. 40—159)

My invention is an improved jacket for filing microfilm with an index system. My film jacket also permits the assemblage of related films in a single jacket for protection and indexing purposes.

Many attempts have heretofore been made to provide jackets or covers for microfilms and other films which can be readily indexed and which can be examined without separating the protecting jacket from the film. Certain difficulties have arisen which have prevented their general acceptance. Among such difficulties was slippage of the film in the jacket, the lack of ready means on the jacket for identifying the film and the difficulty of inserting and removing the film. My improved film jackets holds the film securely in place under ordinary usage without the use of any adhesive, or the like, in contact with the film, permits the inclusion of written or stamped data on the tabs forming part of the film jacket, and permits the build-up of groups of files with uniformity, and the securing together of the jackets containing common subject matter.

The primary object of my invention is to provide a film jacket at low cost which is readily indexable.

Another object of my invention is to provide a film jacket having no protruding edges which can be readily filed in standard size containers such as a check box.

Another object of my invention is to provide a film jacket which will retain the film without slippage and without marring the surface of the film.

A still further object of my invention is to provide a film jacket with a unitary indexing tab and viewing envelope.

The principles and characteristic features of my invention and the best mode in which I have contemplated applying such principles and making and using my invention will further appear in the following description and the accompanying drawings in illustration thereof.

In the drawings—

Figure 1:
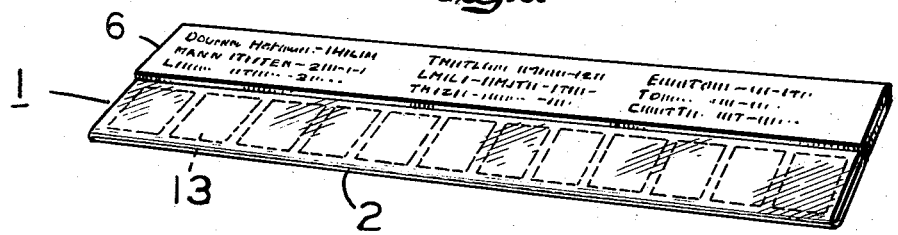
Fig. 1 is a perspective view of my improved film jacket with film inserted therein.
Figure 2:
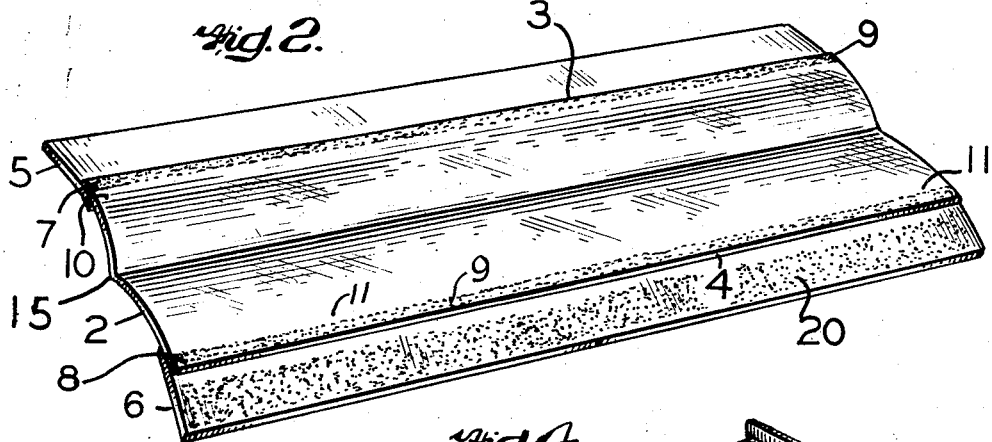
Fig. 2 is a perspective view of my improved film jacket prior to sealing.
Figure 3:
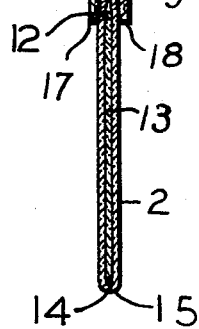
Fig. 3 is an enlarged, side elevational view of my improved film jacket.

The film jacket 1 comprises a folded, transparent sheet 2 having its opposing longitudinal edge sections 3 and 4 secured to a pair of opposed index boards or tabs 5 and 6 which are secured together throughout their lengths and substantially throughout their depths.

The upper portions 7 and 8 of the edge sections 3 and 4, confined within the boundary of the tabs 5 and 6, are secured together with a suitable adhesive 9 but the lower portions 10 and 11 of the edge sections 3 and 4 are free to embrace the upper edge 12 of the microfilm 13 whose lower edge 14 rests on the fold 15 of the folded sheet 2. The thickness of the transparent sheet and of the tabs is greatly exaggerated in the drawings for clarity. The microfilm may be inserted into the jacket by any convenient means.

The normal depth of the exposed transparent sheet 2 is such that it is slightly less than the depth of the film to be protected in order that the upper edge 12 of the microfilm 13 is always biased between the tabs 5 and 6. That is to say, as the tabs 5 and 6 are securely bound to each other throughout the greater portion of their depth and are bound to the longitudinal edge sections 3 and 4 throughout their touching portions, by an adhesive 20, the tabs 5 and 6 have a resiliency which biases the edge sections 3 and 4, within the confines of the tabs, against each other or against the microfilm which may be placed therebetween.

I have found that it is preferable to have tabs of a thickness not less than the thickness of one side of the folded sheet 2 and not greater than the combined thickness of the opposing sides of the sheet 2. Thus, if the thickness of the unfolded transparent sheet 2 is, say, 5 mils, then the thickness of each tab should not be less than 5 mils nor greater than 10 mils. This relationship results in a durable film jacket having the requisite compression strength to withstand normal usage and spaces the sheets from each other thereby preventing the filed film jackets from distorting or scratching one another.

Figure 4:
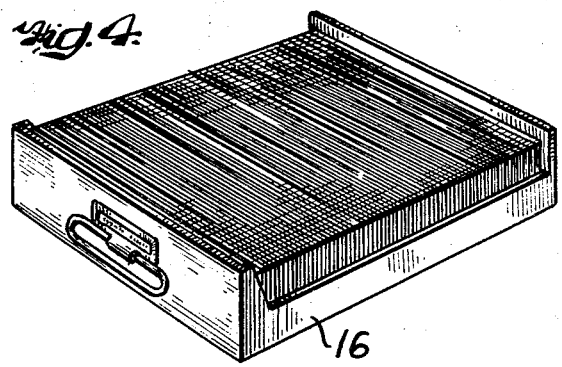
Fig. 4 is a perspective view of an index card tray containing a number of my improved jackets.

It is preferable to have the tabs of standard depth regardless of the depth of the envelope and of standard length, or multiples thereof, in order that they may be conveniently filed within a standard index tray 16, such as illustrated in Fig. 4. An important advantage of having a standard depth of tab is that it provides a uniform amount of space for recording the data necessary to properly and quickly identify the subject matter contained on the microfilm held within the envelope. The bottom edges 17 and 18 of the tabs 5 and 6 form a substantially smooth jointure with the transparent sheet 2. Thus, the outside of the film jacket presents no protrusions which might be caught within the projection apparatus, nor does it present any protrusions on which to catch adjacent jackets when filed in the index tray.

Figure 5:
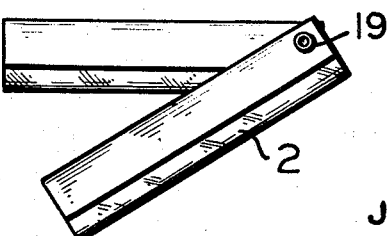
Fig. 5 is a view of several of my improved film jackets rotatably secured together at one corner thereof.

As may be seen in Fig. 5, my improved jacket also permits the securing together of multiple jackets by means of a fastener or eyelet 19 thereby permitting the accumulation of common subject matter in a single grouping. The latter feature is particularly important when additional records, such as the history of patients in a hospital, are added from time to time. It is to be understood that the individual jackets embraced by an eyelet can be rotated about the eyelet to permit viewing and magnification of the microfilm in the jacket without interference from the other jackets secured thereto.

The use of the tabs for identification purposes also indicates the proper side of the jacket to be inserted into a viewer, so that the "right side up" is invariably obtained.

Having described my invention, I claim:

A jacket for storing microfilm comprising a sheet of transparent material folded upon itself to form viewing faces of approximately equal size, and outermost juxtaposed rectangular boards secured together for only a part of their depth to form an indexing tab, said sheet having longitudinal edge sections adhesively secured throughout their length to the inner portions of said boards that are not secured to each other, said longitudinal edge sections having first longitudinal portions farthest from the fold that are secured to each other and second longitudinal portions closest to the fold that are capable of being moved apart from each other upon insertion of the microfilm within the jacket, and said portions of said boards that are not secured to each other extending toward said fold in juxtaposition with the first and second longitudinal portions of said longitudinal edge sections for biasing the second longitudinal portions toward each other upon insertion of the microfilm within the jacket, thereby resisting movement of the microfilm.

References Cited in the file of this patent

UNITED STATES PATENTS

| | | |
|---|---|---|
| 976,073 | Harrod | Nov. 15, 1910 |
| 1,151,475 | Kingsley et al. | Aug. 24, 1915 |
| 1,987,377 | Stiles | Jan. 8, 1935 |
| 2,154,510 | King | Apr. 18, 1939 |
| 2,179,884 | Falkoff | Nov. 14, 1939 |
| 2,296,272 | De Sherbinin | Sept. 22, 1942 |
| 2,544,844 | Liber | Mar. 13, 1951 |